US007145886B1

(12) United States Patent
Kitade et al.

(10) Patent No.: US 7,145,886 B1
(45) Date of Patent: Dec. 5, 2006

(54) COMMUNICATION TERMINAL, BASE STATION SYSTEM, AND METHOD OF CONTROLLING TRANSMISSION POWER

(75) Inventors: Takashi Kitade, Yokosuka (JP); Kazuyuki Miya, Kawasaki (JP); Katsuhiko Hiramatsu, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 778 days.

(21) Appl. No.: 09/889,919

(22) PCT Filed: Nov. 27, 2000

(86) PCT No.: PCT/JP00/08336

§ 371 (c)(1), (2), (4) Date: Jul. 25, 2001

(87) PCT Pub. No.: WO01/41331

PCT Pub. Date: Jun. 7, 2001

(30) Foreign Application Priority Data

Nov. 29, 1999 (JP) ................................ 11-337623
Mar. 17, 2000 (JP) ............................ 2000-076032

(51) Int. Cl.
*H04B 7/216* (2006.01)
*H04B 7/00* (2006.01)

(52) U.S. Cl. ...................... 370/320; 370/335; 370/342; 455/13.4; 455/522; 455/127.1

(58) Field of Classification Search ..................... None
See application file for complete search history.

(56) References Cited

U.S. PATENT DOCUMENTS 5,600,706 A * 2/1997 Dunn et al. .............. 455/456.2
5,652,764 A 7/1997 Kanzaki et al.
5,691,974 A * 11/1997 Zehavi et al. ............... 370/203
5,757,767 A * 5/1998 Zehavi ........................ 370/208
5,859,875 A 1/1999 Kato et al.
5,886,987 A * 3/1999 Yoshida et al. ............. 370/318
5,933,782 A * 8/1999 Nakano et al. ............. 455/522
6,011,980 A * 1/2000 Nagano et al. ............. 455/572
6,188,678 B1 * 2/2001 Prescott ...................... 370/318

(Continued)

FOREIGN PATENT DOCUMENTS

EP 0987834 A2 3/2000

(Continued)

OTHER PUBLICATIONS

Japanese Office Action dated Mar. 2, 2004 with English translaion.

(Continued)

*Primary Examiner*—Chau Nguyen
*Assistant Examiner*—Cynthia L. Davis
(74) *Attorney, Agent, or Firm*—Stevens, Davis, Miller & Mosher, LLP

(57) ABSTRACT

An antenna 20 receives signals orthogonal to each other transmitted from different antennas of a base station, and a despreader 202 and a spreader 203 despread the respective received signals using the same spreading code used in the base station, a demodulator 204 and a demodulator 205 demodulate the despread signals, a reception power measuring section 207 and a reception power measuring section 208 measure reception power from the demodulation results, a reception power combiner 209 combines measured reception power, and a transmission power controller 212 controls transmission power based on combined reception power. This makes it possible to perform open loop transmission power control at high speed and with high accuracy even when a fading variation is small.

2 Claims, 7 Drawing Sheets

U.S. PATENT DOCUMENTS

| | | | | |
|---|---|---|---|---|
| 6,697,347 | B1 * | 2/2004 | Ostman et al. | 370/335 |

FOREIGN PATENT DOCUMENTS

| | | |
|---|---|---|
| JP | 07095151 | 4/1995 |
| JP | 08195703 | 7/1996 |
| JP | 09102768 | 4/1997 |
| JP | 09238098 | 9/1997 |
| WO | 9951049 | 10/1999 |

OTHER PUBLICATIONS

International Search Report dated Feb. 27, 2001.

Salmasi, A.; Gilhousen, K.S.; "On the system design aspects of code division multiple access(CDMA) applied to digital cellular and personal communications networks" IEEE, pp. 57-62, 1999.

3GPP TSG-RAN WG1#7; "Performance Analysis on OL-TPC based on parallel transmitted Midamble." p. 1-2, Aug. 30-Sep. 3, 1999.

* cited by examiner

COMMUNICATION TERMINAL, BASE STATION SYSTEM, AND METHOD OF CONTROLLING TRANSMISSION POWER

TECHNICAL FIELD

The present invention relates to a communication terminal apparatus a base station apparatus, and a transmission power control method that perform open-loop transmission power control.

BACKGROUND ART

CDMA (Code Division Multiple Access), which is one of multiple access of a radio transmission system, is a method for spreading a spectrum of an information signal to a sufficiently wide band as compared with an original information bandwidth to transmit the signal, and it is capable of increasing spectral efficiency highly, and accommodating numerous users.

In CDMA, however, there is a near-far problem, specifically, in the case where a desired transmitting station is located at a far place and an undesired transmitting station (interference station) is located at a near place, reception power of a signal transmitted from the interference station becomes larger than reception power of a signal transmitted from the desired transmitting station, and this makes it impossible to suppress cross-correlation between spreading codes by only processing gain to make it impossible to perform communications.

Hence, a cellular system using CDMA needs transmission power control according to a state of each transmission channel on a reverse link. Moreover, in a terrestrial mobile communication, transmission power control for making compensation for a variation in a momentary value of reception power is needed as measures against fading, which is a cause of deteriorating channel quality.

Herein, a duplex system in multiple access includes TDD (Time Division Duplex) and FDD (Frequency Division Duplex).

TDD is a system that time-divides the same radio frequency into a reverse link and a forward link to perform communication, and the frequency correlation relating to fading variations between transmitting signal and received signal are 1 since the transmission and reception are in the same band. Then, in the case where switching time between both is sufficiently short, since TDD has the high time correlation between transmission and reception propagation path states such as fading variation and the like, it is possible to perform the open-loop transmission power control that controls transmission power based on reception power at a communication terminal.

Also, in FDD that performs communications at different frequencies between the reverse link and the forward link, when the communication terminal originates a call using RACH (Random Access Channel), a transmission power value is determined by the open-loop transmission power control based on a transmission power value of a broadcast channel notified by the broadcast channel, an interference power value at a base station, a target power value at a base station reception end, and reception power of the broadcast channel.

The following will explain the conventional CDMA base station and communication terminal that perform the open-loop transmission power control with reference to the drawings.

FIG. 1 is a block diagram illustrating the configuration of the conventional base station. The base station illustrated in FIG. 1 comprises a modulator 11 for modulating transmitting data, a spreader 12 for multiplying the modulated signal by spreading code A to spread, an antenna 13 for receiving and transmitting the signal, a despreader 14 for multiplying the received signal by spreading code B to despread, and a demodulator 15 for demodulating the despread signal.

Transmitting data is modulated by the modulator 11 and the modulated data is spread by the spreader 12 using spreading code A, and the resultant is transmitted via the antenna 13.

The signal received via the antenna 13 is subjected to despreading processing by the despreader 14 using spreading code B, and the despread signal is demodulated by the demodulator 15 to extract received data.

FIG. 2 is a block diagram of the configuration of the conventional communication terminal. The communication terminal illustrated in FIG. 2 comprises an antenna 21 for receiving and transmitting a signal, a despreader 22 for multiplying the received signal by spreading code A to despread, a demodulator 23 for demodulating the despread signal, a reception power measuring section 24 for measuring a reception power value from the demodulation result, a modulator 25 for modulating transmitting data, a spreader 26 for multiplying the modulated signal by spreading code B to spread, and transmission power controller 27 for performing transmission power control based on the reception power value and the like.

Herein, the reception power measuring section 24 provides average processing to the measured reception power value in order to suppress the momentary variation of the reception power value caused by fading and the like, and outputs the reception power average value to the transmission power controller 27.

The signal received via the antenna 21 is subjected to despreading processing by the despreader 22 using spreading code A, and the despread signal is demodulated by the demodulator 23, so that received data is extracted and the demodulation result is outputted to the reception power measuring section 24. Then, reception power is measured from the demodulation result by the reception power measuring section 24, the measurement result is inputted to the transmission power controller 27, and a transmission power value is determined by the transmission power controller 27 based on the reception power value and the like.

Transmitting data is modulated by the modulator 25, and the modulated data is subjected to spreading processing by the spreader 26 using spreading code B. The power is amplified by the transmission power controller 27 based on the determined transmission power value, and the resultant is transmitted as a radio signal from the antenna 21.

In this way, according to the conventional radio transmission system, the base station transmits a signal from one antenna, and the communication terminal performs the open-loop transmission power control based on the reception power of the received signal.

However, since the communication terminal of the conventional radio transmission system provides average processing to the measured reception power value, it takes much time to suppress the momentary variation to calculate a high accurate reception power average value when the fading variation is slow, and this causes a problem in which the open-loop transmission power control cannot be performed at high speed and with high accuracy.

DISCLOSURE OF INVENTION

It is an object of the present invention to provide a communication terminal apparatus, a base station apparatus, and a transmission power control method that are capable of calculating a reception power average value at high speed and with high accuracy, and are capable of performing open-loop transmission power control at high speed and with high accuracy, even when a fading variation is slow.

This object can be attained when signals orthogonal to each other are transmitted as radio signals from different antennas placed in parallel at the base station side, and reception power of the respective received signals are measured and combined and the open-loop transmission power control is performed based on the combined reception power at the communication terminal side.

BEST MODE FOR CARRYING OUT THE INVENTION

Embodiments of the present invention will be specifically explained with reference to the drawings accompanying herewith.

First Embodiment

Figure 3:
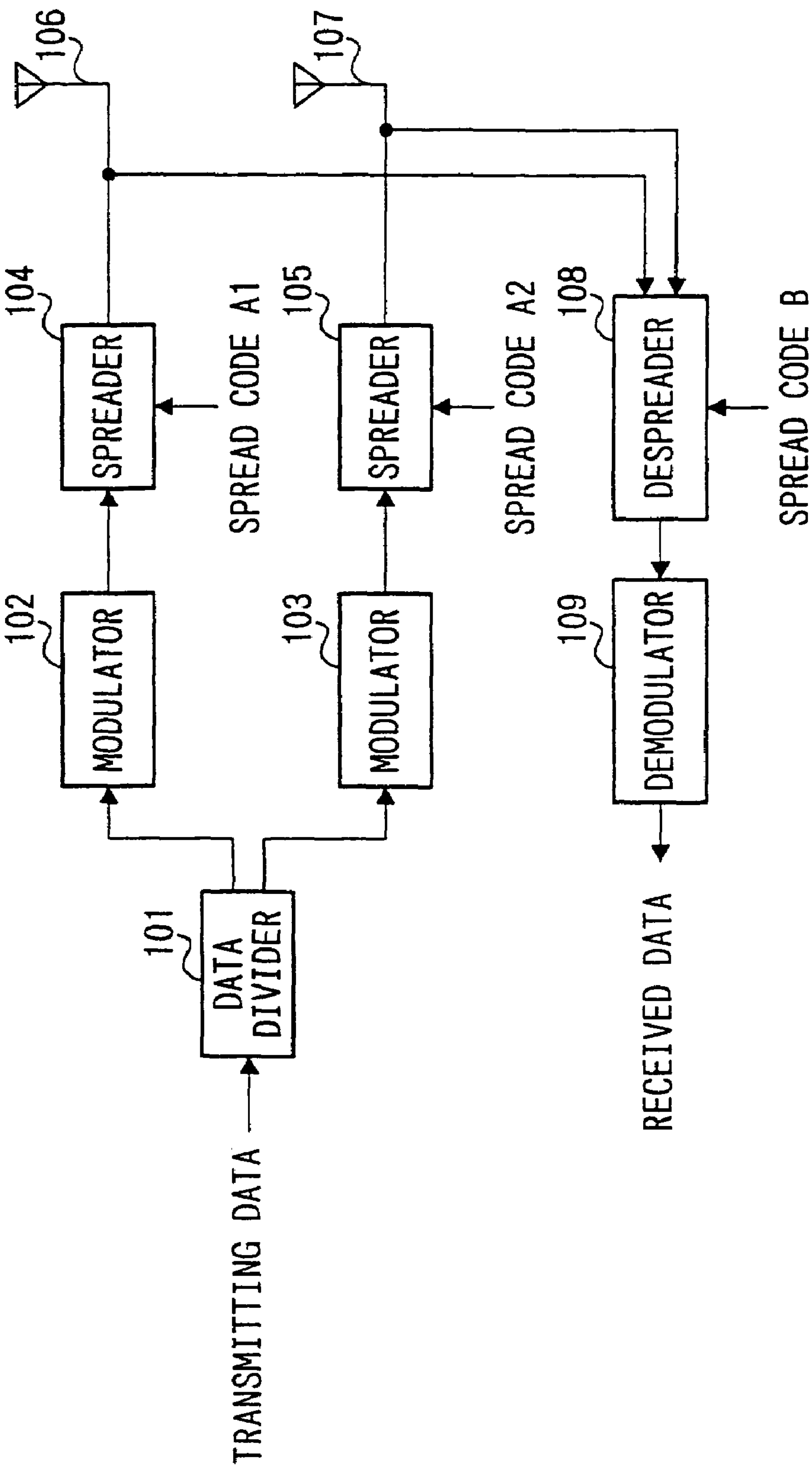
FIG. 3 is a block diagram illustrating the configuration of a base station according to a first embodiment of the present invention.

FIG. 3 is a block diagram illustrating the configuration of the base station according to one embodiment of the present invention. Additionally, in the following explanation, it is assumed that the number of transmission sequences of the base station is 2 in order to simplify the explanation.

Figure 2:
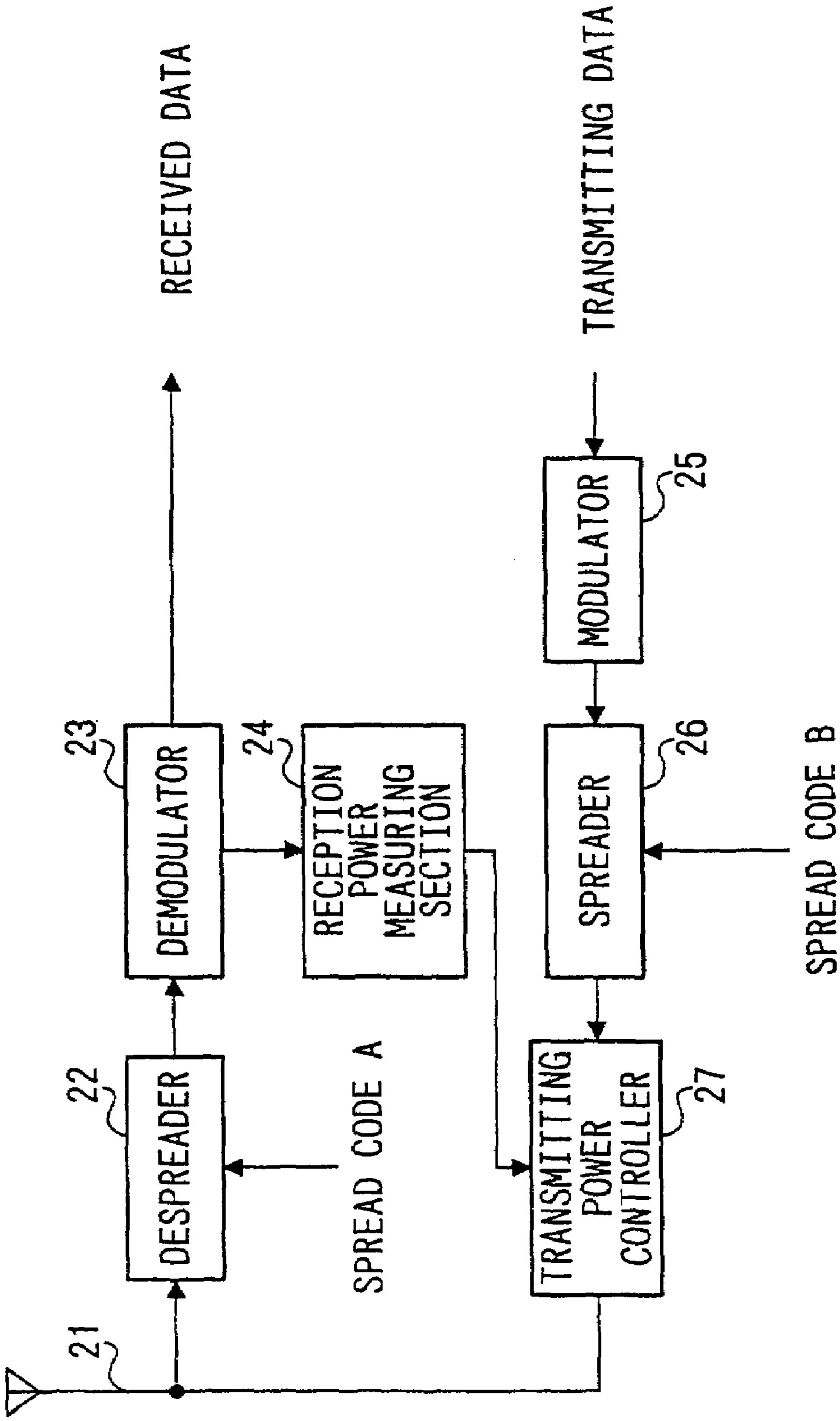
FIG. 2 is a block diagram illustrating the configuration of the conventional communication terminal.

In the base station illustrated in FIG. 2, a data divider 101 divides transmitting data to the amounts corresponding to the number of antennas. A data dividing method includes a method for dividing data by serial/parallel conversion or a method for simply dividing data in order for the same data to be transmitted from each antenna, and the like.

A modulator 102 and a modulator 103 modulate transmitting data divided and a spreader 104 multiplies the modulated signal by spreading code A1 to spread. A spreader 105 multiplies the modulated signal by spreading code A2 to spread. Here, spreading code A1 and spreading code A2 are codes, which are orthogonal to each other. Multiplication of signals by the spreading codes, which are orthogonal to each other, establishes the relationship in which an output signal of the spreader 104 and an output signal of the spreader 105 are orthogonal to each other.

An antenna 106 transmits the output signal of the spreader 104 as a radio signal, and an antenna 107 transmits the output signal of the spreader 105 as a radio signal. Also, the antenna 106 and the antenna 107 receive the signals transmitted from the communication terminal.

A despreader 108 multiplies the received signal by spreading code B to despread, and a demodulator 109 demodulates the despread signal and extracts received data.

An explanation will be next given of the flow of the signals transmitted and received at the base station of FIG. 3. Transmitting data is divided to the amounts corresponding to the plurality of antennas and modulated by the modulator 102 and the modulator 103, and the modulated data is inputted into the spreader 104 and the spreader 105. Then, the spreader 104 and the spreader 105 spread respective divided data using spreading code sequences, which are orthogonal to each other.

The spread signals are transmitted in parallel from the antenna 106 and the antenna 107. In addition, radio signals transmitted in parallel from the different antennas are subjected to the fading variations, which are independent of each other.

The signals received by the antenna 106 and the antenna 107 are subjected to despreading processing by the despreader 108 using spreading code B. The despread signals are demodulated by the demodulator 109, so that received data is extracted.

Figure 4:
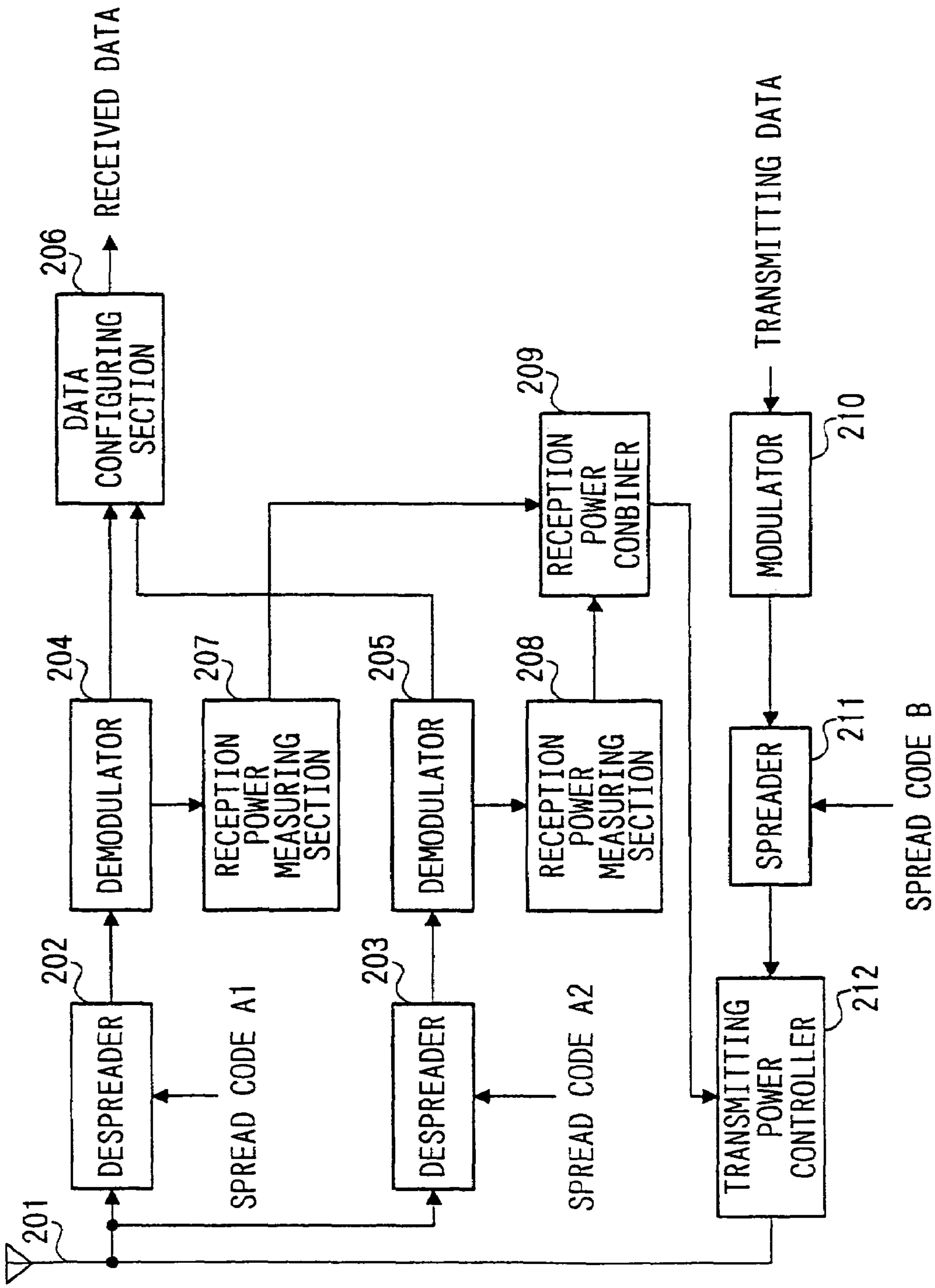
FIG. 4 is a block diagram illustrating the configuration of a communication terminal according to the first embodiment of the present invention.

An explanation will be next give of the configuration of the communication terminal according to this embodiment with reference to the block diagram illustrated in FIG. 4.

As the communication terminal illustrated in FIG. 4, an antenna 201 transmits a signal as a radio signal, and receives a signal transmitted from the base station. A despreader 202 and a despreader 203 multiply the received signals by the same codes as spreading code A1 and spreading code A2 used in the transmitting side to despread, respectively. A demodulator 204 demodulates the signals despread with spreading code A1 and a demodulator 205 demodulates the signals despread with spreading code A2, and a data configuring section 206 configures demodulated data back to the pervious data format to which no data division is subjected.

A reception power measuring section 207 measures reception power from the demodulation result of the demodulator 204, and averages them. A reception power measuring section 208 measures reception power from the demodulation result of the demodulator 205, and averages them. It is noted that a reception power measuring section 207 and a reception power measuring section 208 generally measure reception power of a known signal portion such as a Pilot Symbol, a Midamble, and the like.

A reception power combiner 209 combines the reception power average values calculated by the reception power measuring sections 207 and the reception power measuring section 208. The method for combining reception power includes a simply calculating method, a method for weighting the respective reception power and adding them thereafter, and the like. In the case of weighting the respective reception power and adding them thereafter, transmission power can be controlled accurately as compared with the case of using the value obtained by simply adding the reception power of the respective data.

A modulator 210 modulates transmitting data. A spreader 211 multiplies the modulated signal by spreading code B to spread. A transmission power controller 212 determines a transmission power value $P_{UE}$, which is given by the following expression (1), based on the combined reception power average value and the like, and amplifies power of the transmitting signal to the corresponding transmission power value.

$$P_{UE}=L_P+I_{BTS}+C \quad (1)$$

where $L_P$ is a propagation loss, which is a difference between the transmission power value of the base station and the reception power average value combined by the reception power combiner 209, $I_{BTS}$ is an interference power value at the base station, and C is a constant. Additionally, the value of C is taught to the communication terminal apparatus from the base station apparatus via a layer 3.

An explanation will be next given of the flow of the signal transmitted and received at the communication terminal of FIG. 4. The signal received by the antenna 201 is subjected to despreading processing with spreading code A1 at the despreader 202, and is subjected to despreading processing with spreading code A2 at the despreader 203. The signal despread with spreading code A1 is demodulated by the demodulator 204, and the demodulation result is inputted to the reception power measuring section 207. The signal despread with spreading code A2 is demodulated by the demodulator 205, and the demodulation result is inputted to the reception power measuring section 208. The data configuring section 206 configures demodulated data back to the pervious data format to which no data division is subjected, obtaining received data.

Moreover, reception power is measured by the reception power measuring section 207 based on the demodulation result of the demodulator 204, reception power is measured by the reception power measuring section 208 based on the demodulation result of the demodulator 205, and the measurement results of the receptive reception power are inputted to the reception power combiner 209.

Then, the respective reception power values are combined by the reception combiner 209, and the transmission power controller 212 determines a transmission power value based on the combined reception power, the transmission power value of the base station, and the target reception power value at the base station.

Transmitting data is modulated by the modulator 210, and the modulated data is subjected to spreading processing at the spreader 211 with spreading code B. Then, the spread transmitting signal is amplified to the corresponding transmission power value by the transmission power controller 212, and the resultant is transmitted as a radio signal from the antenna 201.

Hence, transmission of signals, which are orthogonal to each other, from the different antennas at the base station side makes it possible to measure reception power of the plurality of received signals whose fading conditions are independent of each other at the communication terminal side. This makes it possible to reduce the time which lapses before the momentary variation is suppressed.

Further, at the communication terminal side, reception power of a plurality of signals whose fading states are independent of each other is measured, and based on the combined reception power value, the open-loop transmission power control is performed. Therefore, it is possible to perform the transmission power control with high accuracy taking paths into account, and to decrease the control error.

Furthermore, at the base station side signals orthogonal to each other are transmitted from different antennas, it is thereby possible to reduce the time which lapses before the momentary variation is suppressed.

Additionally, the above embodiment has used the method in which the respective transmitting signals are multiplied by the spreading codes orthogonal to each other in order to explain the method for making the respective transmitting signals orthogonal to each other. The present invention, however, can obtain the same effect by making the transmitting signals orthogonal to each other using the other method, for example, in which the transmitting signals orthogonal to each other are multiplied by the same spreading code.

Second Embodiment

In order for a communication terminal to perform the open-loop transmission power control, the terminal needs to recognize the transmission power of a base station. Since the transmission power of control signals on BCH (Broadcast Channel), PCH (Paging Channel) and FACH (Forward Link Access Channel) is fixed, it is not necessary to obtain information indicative of the transmission power from the base station during communications.

In other words, the communication terminal measures the reception power of the control signals to perform the open-loop power transmission control, and is thereby capable of reducing a computation amount. In the second embodiment a case will be described where a base station with two transmission sequences transmits two kinds of control signals from different antennas.

Figure 1:
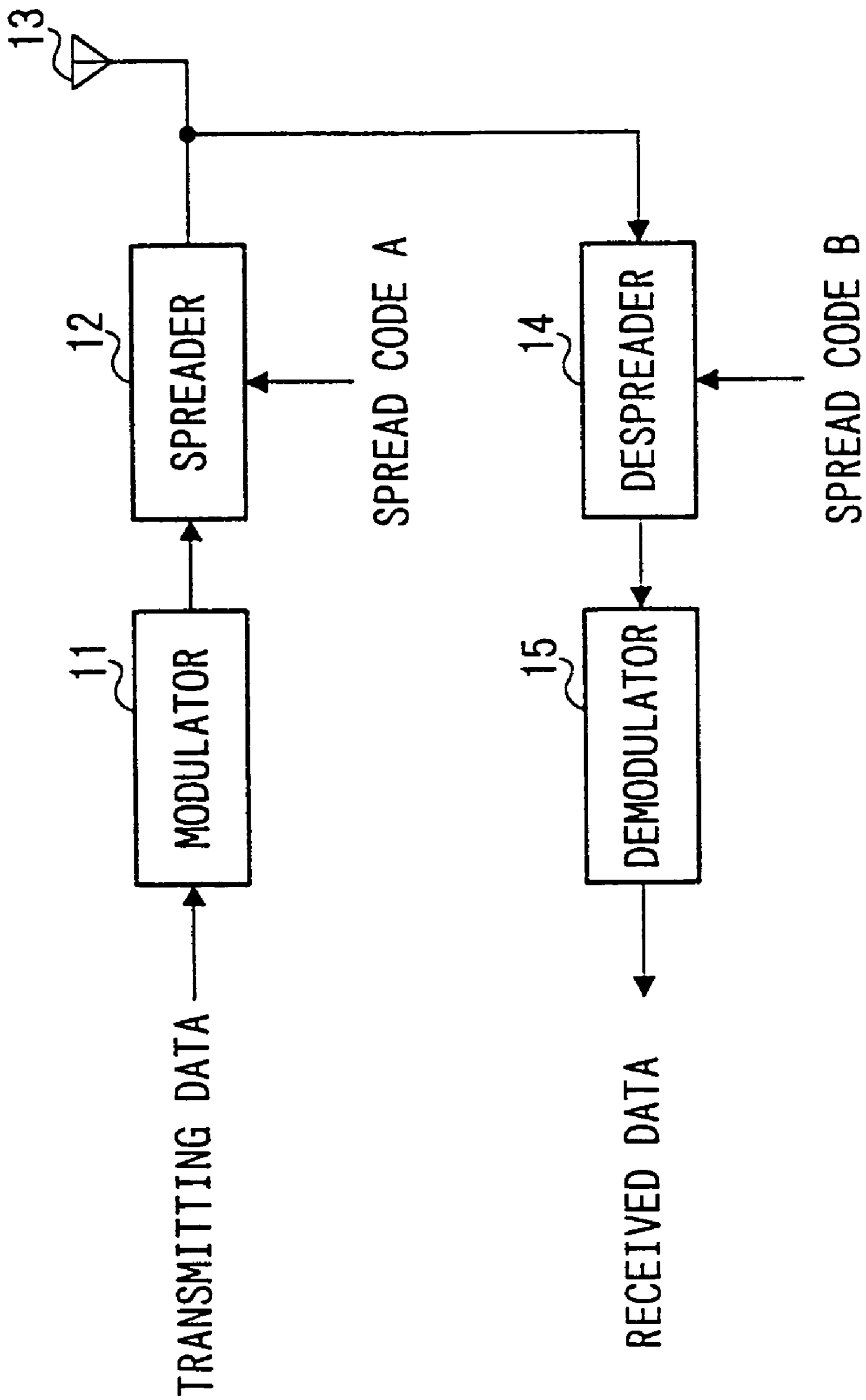
FIG. 1 is a block diagram illustrating the configuration of the conventional base station.
Figure 5:
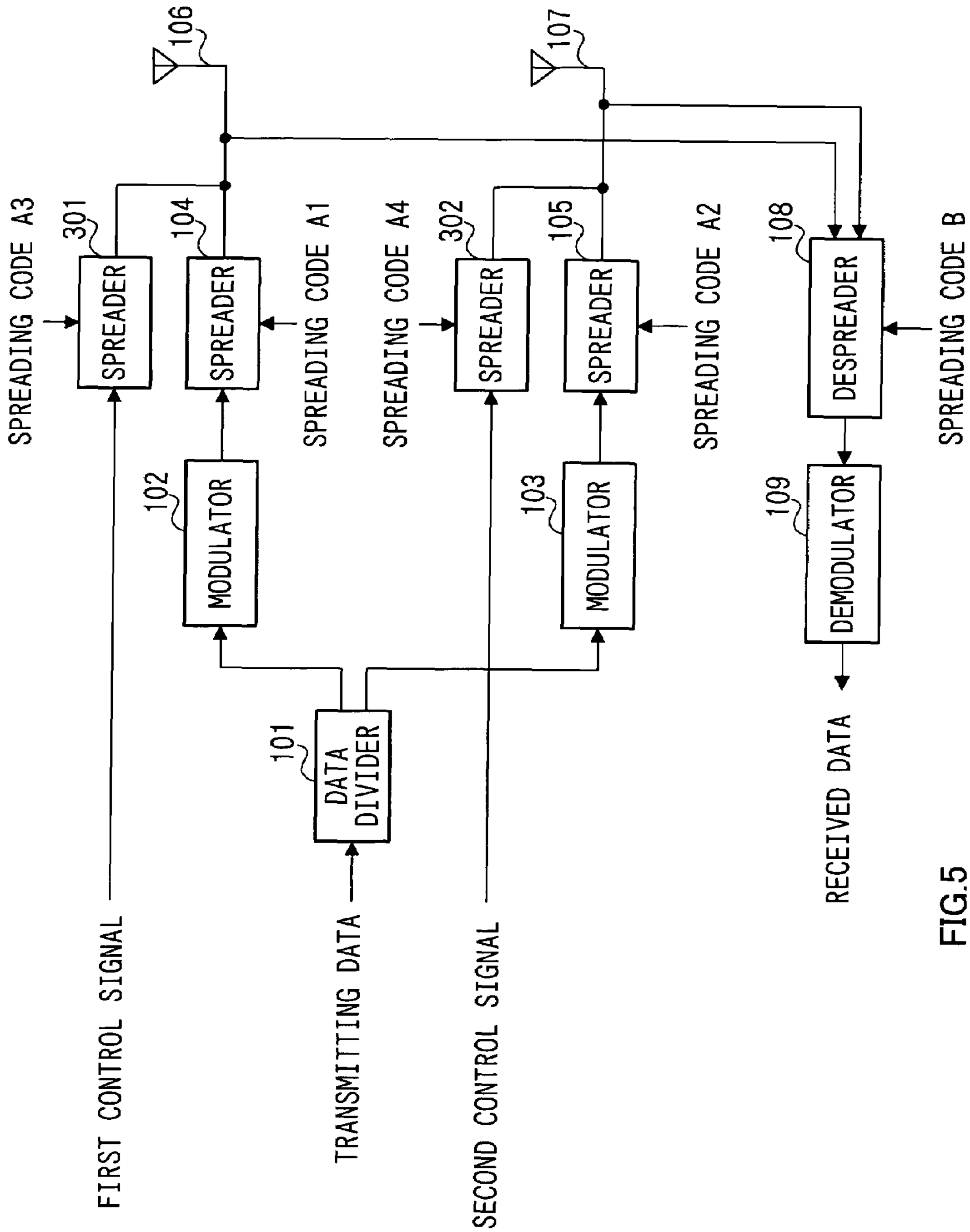
FIG. 5 is a block diagram illustrating the configuration of a base station according to a second embodiment of the present invention.

FIG. 5 is a block diagram illustrating the configuration of the base station apparatus according to the second embodiment. In addition, in the base station illustrated in FIG. 5, sections common to the base station in FIG. 1 are assigned the same reference numerals as in FIG. 1 to omit descriptions thereof.

A spreader 301 multiples a first control signal by spreading code A3 to spread, and a spreader 302 multiples a second control signal by spreading code A4 to spread.

The antenna 106 transmits a radio signal obtained by multiplexing the output signal of the spreader 104 and the output signal of the spreader 301, and the antenna 107 transmits a radio signal obtained by multiplexing the output signal of spreader 105 and the output signal of spreader 302. Further, the antennas 106 and 107 receive signals transmitted from the communication terminal.

Figure 6:
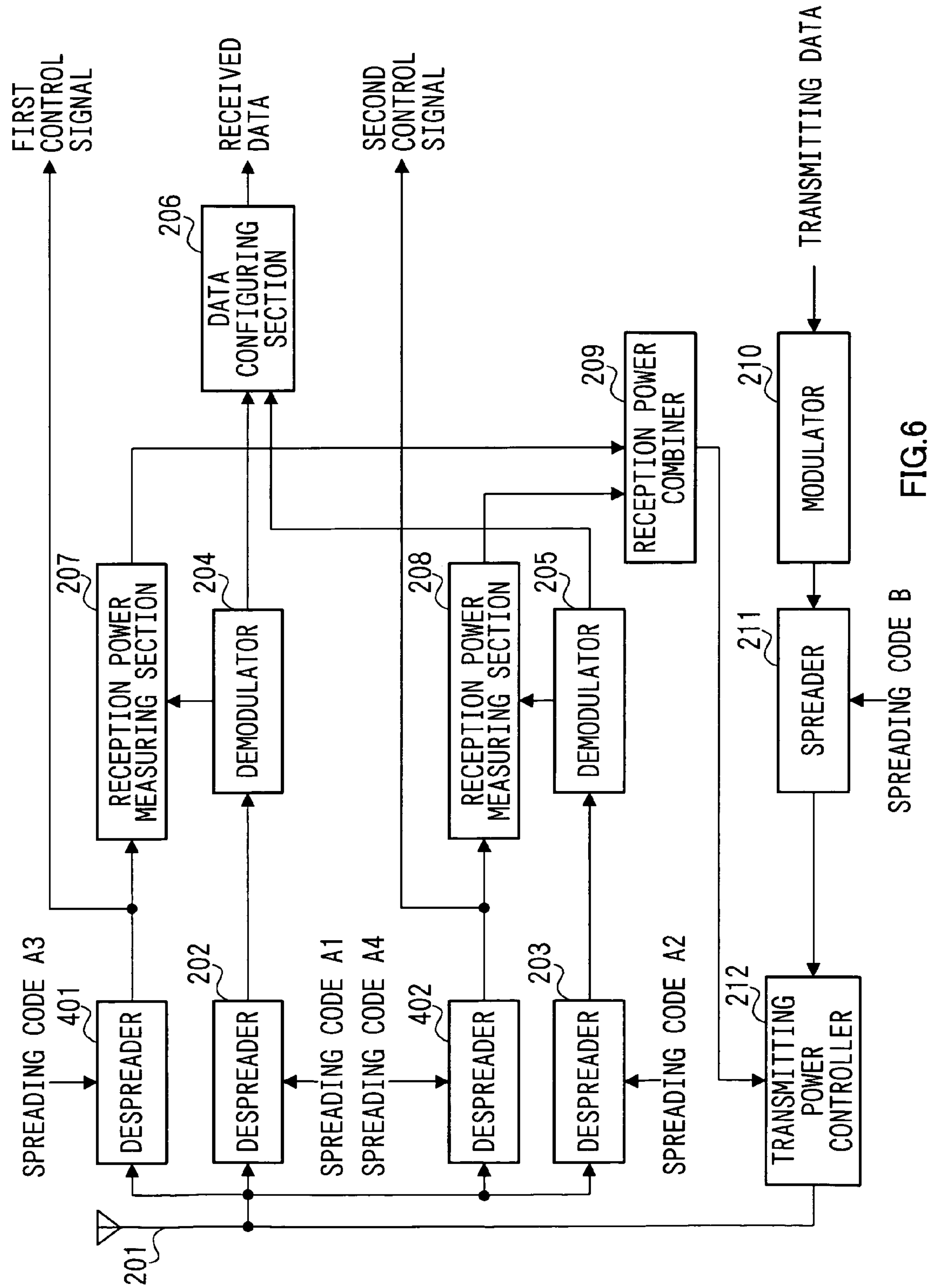
FIG. 6 is a block diagram illustrating the configuration of a communication terminal according to the second embodiment of the present invention.

FIG. 6 is a block diagram illustrating the configuration of the communication terminal according to this embodiment. In addition, in the communication terminal illustrated in FIG. 6, the sections common to the communication terminal apparatus in FIG. 2 are assigned the same reference numerals as in FIG. 2 to omit descriptions thereof.

A despreader 401 and a despreader 402 multiply the received signal respectively by spreading code A3 and spreading code A4 used on the transmitting side to despread.

The reception power measuring section 207 measures reception power from the despread result of the despreader 401, and averages them. The reception power measuring section 208 measures reception power from the despread result of the despreader 402, and averages them.

Figure 7:
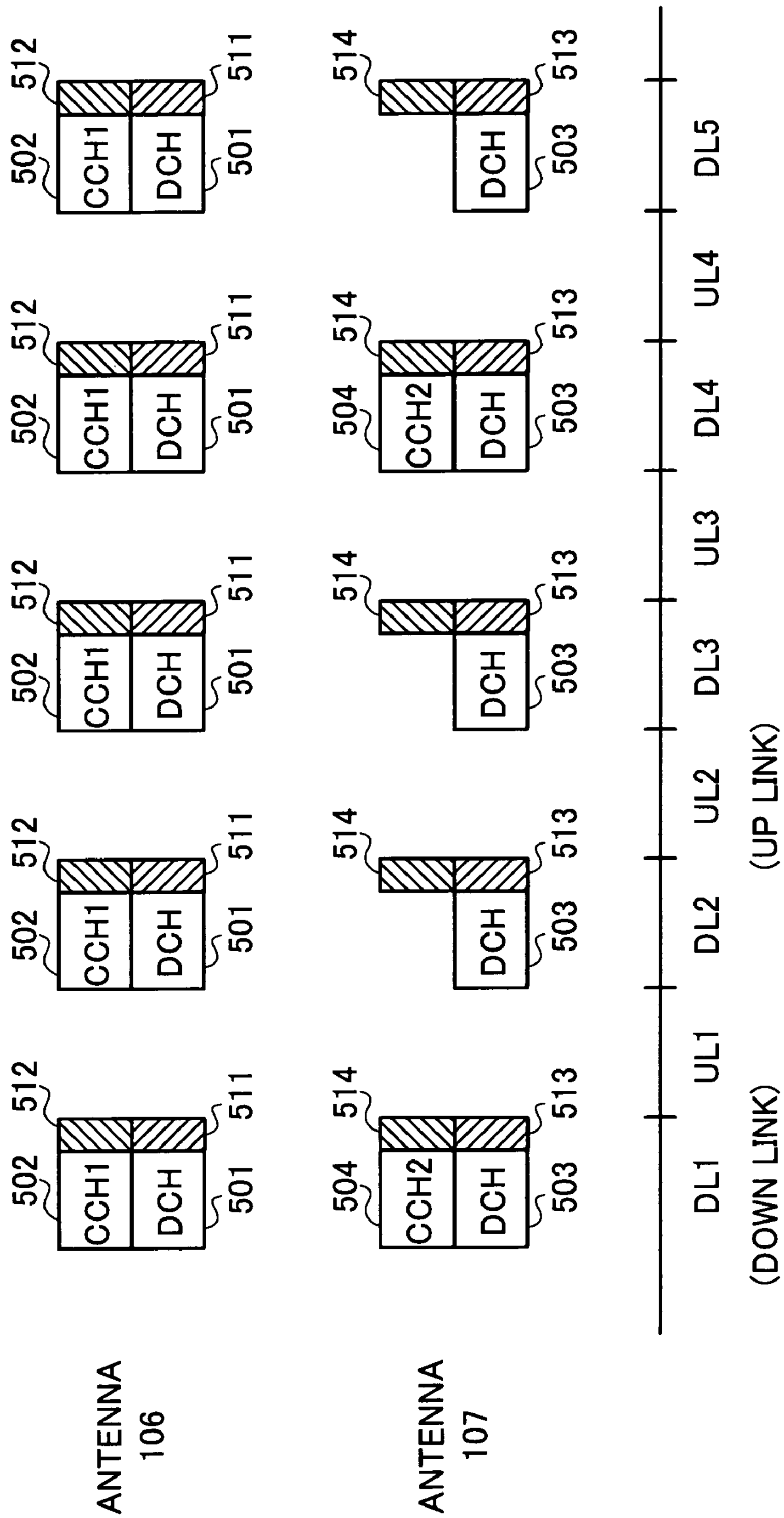
FIG. 7 is a diagram to explain a signal configuration on a radio transmission path according to the second embodiment of the present invention.

FIG. 7 is a diagram to explain a signal configuration on a radio transmission path according to this embodiment.

Control signals include one on BCH or PCH which is transmitted constantly, and another one on FACH which is transmitted intermittently. In addition, the FACH signal is transmitted in response to an access request on RACH transmitted from a communication terminal apparatus.

FIG. 7 illustrates a case where first control signal 501 is the signal (for example, on BCH) which is constantly transmitted, and second control signal 502 is the signal (for example, on FACH) which is transmitted intermittently.

As illustrated in FIG. 7, from the antenna 106 a multiplexed signal of Dedicated Channel (DCH) signal 501 and first control signal (CCH1) 502 is transmitted, and from the antenna 107 a multiplexed signal of dedicated channel signal (DCH) 503 and second control signal (CCH2) 504 is transmitted.

Then, Dedicated Channel signal 501 is transmitted with midamble 511, and first control signal 502 is transmitted with midamble 512. Further, Dedicated Channel signal 503 is transmitted with midamble 513, and second control signal 504 is transmitted with midamble 514.

In order to maintain the received quality, it is preferable to perform the open-loop transmission power control constantly for each slot. However, when the control signal is transmitted intermittently, it is not possible to perform the open-loop transmission power control during an interval the control signal is not transmitted.

Then, as illustrated in FIG. 7, on a slot on which second control signal 504 is not transmitted, only midamble 514 is transmitted. Therefore, even when the control signal is transmitted intermittently, it is possible to perform the open-loop transmission power control constantly for each slot and to maintain the received quality.

Thus, reception power of a plurality of control signals whose fading conditions are independent of each other is measured at a communication terminal side, and based on the combined reception power value, the open-loop transmission power control is performed. In this case, since the transmission power of the control signal is fixed, the communication terminal does not need to obtain information indicative of the transmission power from a base station during communications, and is capable of reducing a computation amount.

In addition, in this embodiment BCH, PCH and FACH are described as examples of control signal, but control signals in actual communications are not limited to the foregoing, and it may be possible in the present invention to use another control signal to perform the open-loop transmission power control signal.

Further, in this embodiment the case is described where midamble is transmitted on each slot, but the present invention is not limited to the above case. It may be possible to obtain the same effectiveness by transmitting a signal known between transmitting and receiving sides on each slot.

As described above, according to the present invention, the signals, which are orthogonal to each other, are transmitted from the different antennas at the base station side, and reception power of a plurality of received signals whose fading conditions are independent of each other is measured at the communication terminal side. This makes it possible to reduce the time which lapses before the momentary variation is suppressed, and to perform the open-loop transmission power control at high speed and with high accuracy even when the fading variation is small.

This application is based on the Japanese Patent Application No. HEI 11-337623 filed on Nov. 29, 1999, and the Japanese Patent Application No. 2000-076032 filed on Mar. 17, 2000, entire content of which is expressly incorporated by reference herein

INDUSTRIAL APPLICABILITY

The present invention is suitable for use in a communication terminal apparatus that performs open-loop transmission power control and a base station apparatus in a CDMA radio communication system.

The invention claimed is:

1. A communication terminal apparatus that receives a plurality of transmission signals that are transmitted in parallel from different antennas of a base station apparatus, said plurality of transmission signals comprising data spread by respective spreading code sequences, and being multiplexed with respective midambles, said communication terminal apparatus comprising:

- a plurality of despreaders that despread data parts of the plurality of transmission signals by said respective spreading code sequences;
- a plurality of demodulators that demodulate signals despread in the despreaders;
- a data configurer that restores a plurality of data demodulated in the demodulators in form prior to division, and obtains received data;
- a plurality of measurers that measure and average respective reception powers of midamble parts of received transmission signals;
- a combiner that weights a plurality of reception power average values measured at said plurality of measurers, combines weighted reception power average values and obtains a combined reception power; and
- a transmission power controller that performs open loop transmission power control by a value obtained by adding interference power at the base station apparatus and a predetermined constant to a propagation loss which is a difference between transmission power of the base station apparatus and the combined reception power.

2. A radio communication method in a communication terminal apparatus that receives a plurality of transmission signals that are transmitted in parallel from different antennas of a base station apparatus, said plurality of transmission signals comprising data spread by respective spreading code sequences, and being multiplexed with respective midambles, said radio communication method comprising the steps of:

- performing despreading processing of data parts of the plurality of transmission signals by said respective spreading code sequences;
- demodulating a plurality of despread signals;
- restoring a plurality of demodulated signals in form prior to division, and obtaining received data;
- measuring and averaging respective reception power of midamble parts of received transmission signals;
- weighting a plurality of measured reception power average values, combining weighted reception power average values and obtaining a combined reception power; and
- performing open loop transmission power control by a value obtained by adding interference power at the base station apparatus and a predetermined constant to a propagation loss which is a difference between transmission power of the base station apparatus and the combined reception power.

* * * * *